United States Patent [19]
Elliott

[11] 3,947,144
[45] Mar. 30, 1976

[54] COUNTERWEIGHTED MECHANICAL BOOM

[76] Inventor: Barry Elliott, 18320 W. Clifftop Way, Malibu, Calif. 90265

[22] Filed: Aug. 26, 1974

[21] Appl. No.: 500,760

[52] U.S. Cl. .................. 408/235; 90/20.5; 212/49; 248/123; 248/178
[51] Int. Cl.² B23B 47/00; B23C 9/00; B66C 23/72; F16M 11/04
[58] Field of Search .......... 354/293; 33/25 R, 23 R; 212/48, 49; 248/123, 178, 60; 408/235, 236; 137/615; 90/20.5

[56] References Cited
UNITED STATES PATENTS

| | | | |
|---|---|---|---|
| 2,469,844 | 5/1949 | Porter et al. | 33/25 R X |
| 2,631,375 | 3/1953 | Gleason | 33/25 R |
| 2,929,288 | 3/1960 | Harvey et al. | 33/25 R X |
| 3,434,497 | 3/1969 | Bily | 212/48 X |
| 3,743,049 | 7/1973 | Levrini | 212/49 X |
| 3,750,895 | 8/1973 | Durand | 212/48 |
| 3,788,585 | 1/1974 | Masseron | 248/178 |

Primary Examiner—Travis S. McGehee
Assistant Examiner—W. R. Briggs
Attorney, Agent, or Firm—William H. Pavitt, Jr.

[57] ABSTRACT

An articulated swivelling boom combination adapted to carry on one of its extremities a device, such as a camera, which it is desired to be able to move about smoothly in any direction of 360° in a given plane within a predetermined area. The combination comprises an elongated rigid member mounted intermediate its ends for swivelling about a vertical axis in a predetermined arc of rotation with a secondary rigid element similarly swivellingly mounted in the vicinity of each of the ends of the rigid member. The device is mounted on the free end of one of the secondary rigid elements and counterweighting is provided on the free end of the other of the two secondary rigid elements. The two secondary rigid elements may be oppositely directed and their swivelling mounts interlocked by a gear and belt arrangement. Thereby, any movement of the device on the free end of its secondary rigid element produces a compensating counterweighted movement of the other element. Motorized movement control may be provided and control may be by a computer, particularly, for example where device is a machine tool, such as a cutter.

16 Claims, 9 Drawing Figures

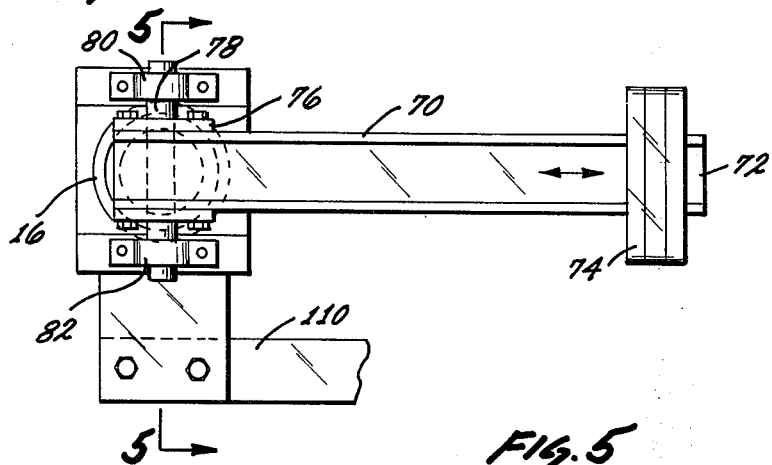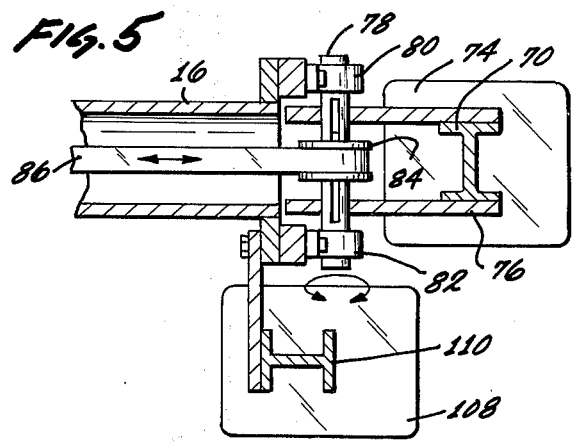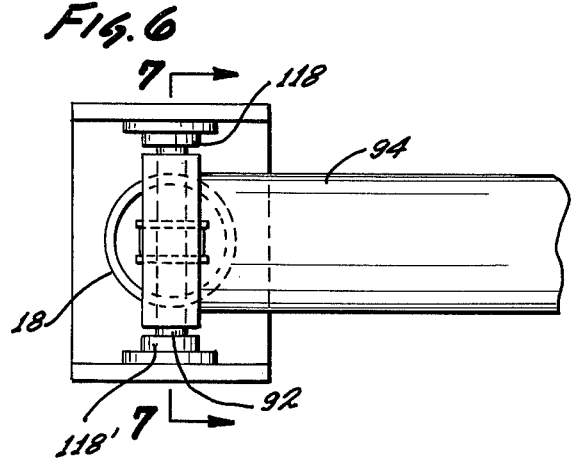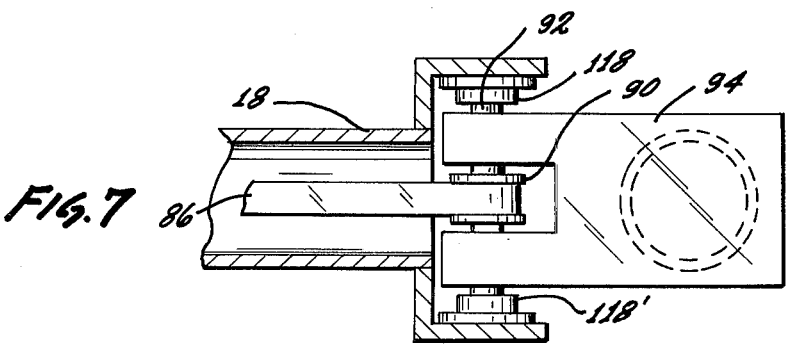

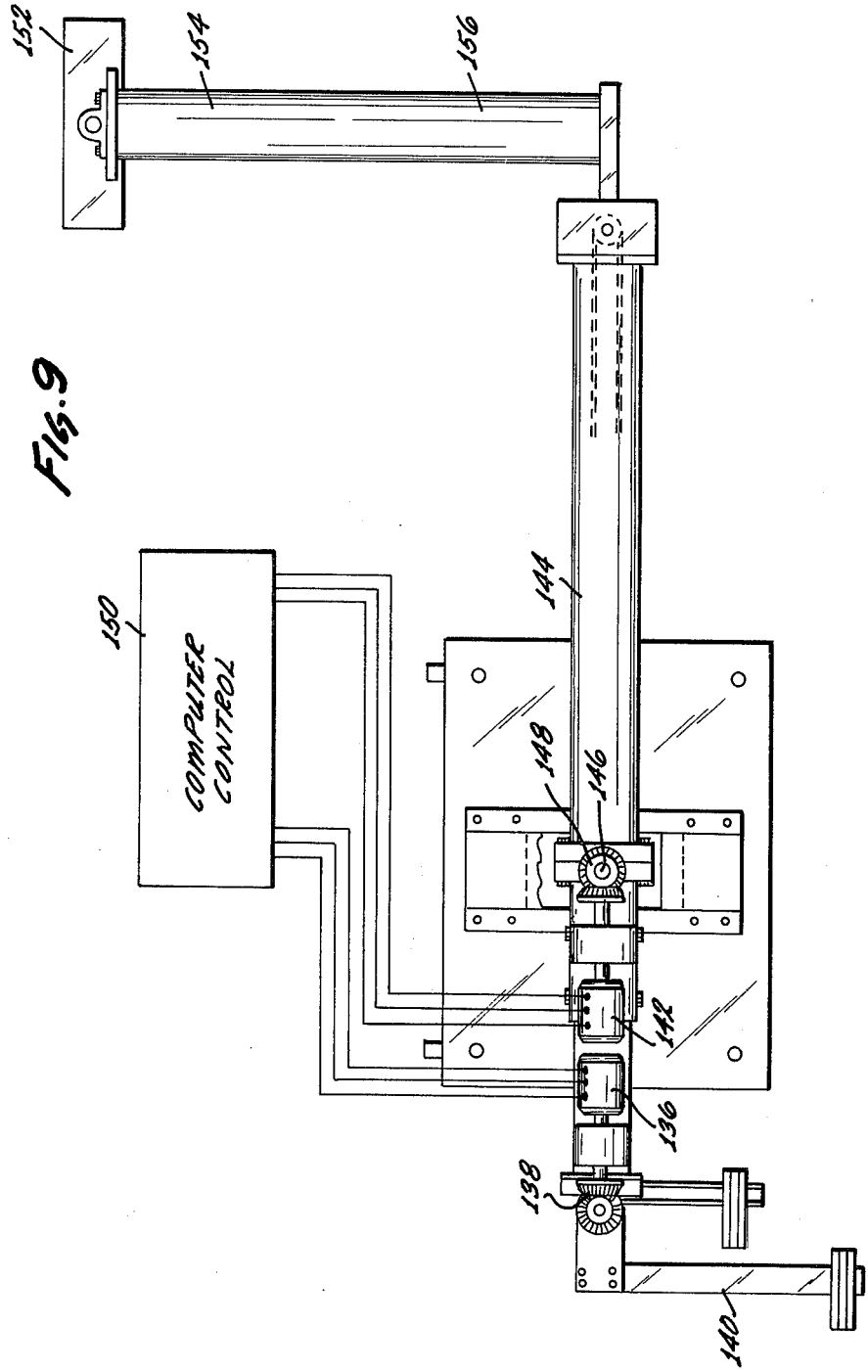

COUNTERWEIGHTED MECHANICAL BOOM

BACKGROUND OF THE INVENTION

1. Field of the Invention

This invention relates generally to the field of mechanical movements with a wide variety of applications, but is particularly related to the field of motion picture and video camera support and handling.

2. Description of the Prior Art

For many years in the taking of motion pictures and more recently, video film, cameramen have needed means to support their cameras, which means enable the cameramen to move their camera about readily and smoothly toward or away from, or to one side or another of the subject being photographed. Such camera mobility permits cameramen to produce many desired film effects.

Heretofore, there have been developed a number of different types of carriers and booms to provide such desired camera mobility. These carriers and booms generally provide excellent camera support and smooth raising and lowering movements for both the camera in its entirety as well as in the angle it may be directed toward the subject being photographed. However, where it is desired to move the camera in a horizontal plane in relation to the subject, prior art devices have always comprised some type of a vehicle which must actually travel over a surface in the vicinity of the subject.

Where the camera is heavy, the vehicle must be not only well built and provided with a finely attenuated and reliable motor control, but the surface upon which it is driven must be smooth — otherwise the camera will be jostled during its movement in the horizontal plane with obvious undesirable effects upon the film taken during any such horizontal movement. In addition, since the cameraman ordinarily always wants to be able to raise and lower his camera and to tilt it, the vehicle must also have a conventional camera boom mounted on it in a very secure manner so that when the vehicle moves no vibration or jerking of the camera is caused by any movement of the boom structure. Because of the support, boom and motor control requirements for the vehicle, the cost of such a vehicle may run into many thousands of dollars. Moreover, the necessity of its being operated on a smooth surface and of having driving and turnaround room may greatly limit the use of the vehicle supported camera to special larger studio areas with provision for vehicle ingress and egress and such a large and smooth driving surface.

It has thus been a considerable handicap to smaller studios in conducting their photographing operations in not having either the capital to acquire prior art camera support vehicles or areas in which they can be effectively employed. Further, even where such vehicles are available, it may be difficult to utilize them for accomplishing smaller camera movements or movements closely in or around the subject to be photographed, and they have not been satisfactory where photographing must be accomplished on any kind of rough terrain.

Thus, prior art camera support means have been quite deficient in satisfying the needs and in overcoming the problems hereinabove described.

SUMMARY OF THE INVENTION

The present invention provides a camera support boom which obviates the problems encountered with prior art boom and carrier devices in that, for a certain substantial area of movement of the camera in a horizontal plane, it is entirely unnecessary to move any vehicle or other element upon which the boom may be swivellingly mounted. All movement of the supported camera in the horizontal plane in such area in any direction is accomplished entirely by holding on to the camera and moving it in any combination of directions while being supported by its boom.

Thus, a primary elongated rigid member is mounted on a base platform for swivelling movement about a vertical axis at a point intermediate the extremities of such member. At each such extremity, a secondary elongated rigid element extends therefrom, being also swivellingly mounted on such extremity, also to pivot about a vertical axis. Each secondary element preferably extends in a direction 180° opposite that of the other element and the swivelling portions of the mountings of the two elements are so connected by gears and a belt that when one element is moved in any arc of rotation, the other element moves in an opposite and corresponding arc of rotation. The device to be moved, such as a camera, is mounted on the free end of one of the two elements, while the free end of the other of the two elements and its extremity of the primary member are counterweighted to place the entire assembly in perfect balance.

Provision may be made for the camera itself to be swivelled about a horizontal and vertical axis where it is mounted to the end of one of the two secondary elements. Also the swivel mounting of the primary member may be made tiltable so that the camera supporting secondary element may be raised or lowered.

In addition, means may be provided which can be manually or hydraulically controlled in the vicinity of the camera of the primary vertical axis to lock the assembly or any part of it in any selected position or angle.

While the present invention is especially designed and adopted for camera support and movement, it may also be utilized to support any other device which must be moved about smoothly in a horizontal plane; and, moreover, such movement may be motor actuated and remotely or computer controlled. The invention, thus, may be utilized for computer controlled machinery, cutting or plotting.

BRIEF DESCRIPTION OF THE DRAWINGS

In the accompanying drawings,

FIG. 3 is an enlarged detail of the rod and belt connection in the circled portion designated 3 in FIG. 1.

FIG. 4 is an end elevation of the counterweighted secondary element as seen in the direction of the arrows 4—4 in FIG. 1.

FIG. 5 is a section taken on lines 5—5 and looking in the direction of the arrows on FIG. 4.

FIG. 6 is a partial end elevation as seen in the direction of the arrows 6—6 in FIG. 1.

FIG. 7 is a section taken on the line 7—7 of FIG. 6.

FIG. 9 is a plan, partly schematic view showing how the apparatus could be adapted for a computerized motor control.

DESCRIPTION OF THE PREFERRED EMBODIMENT

Figure 1:
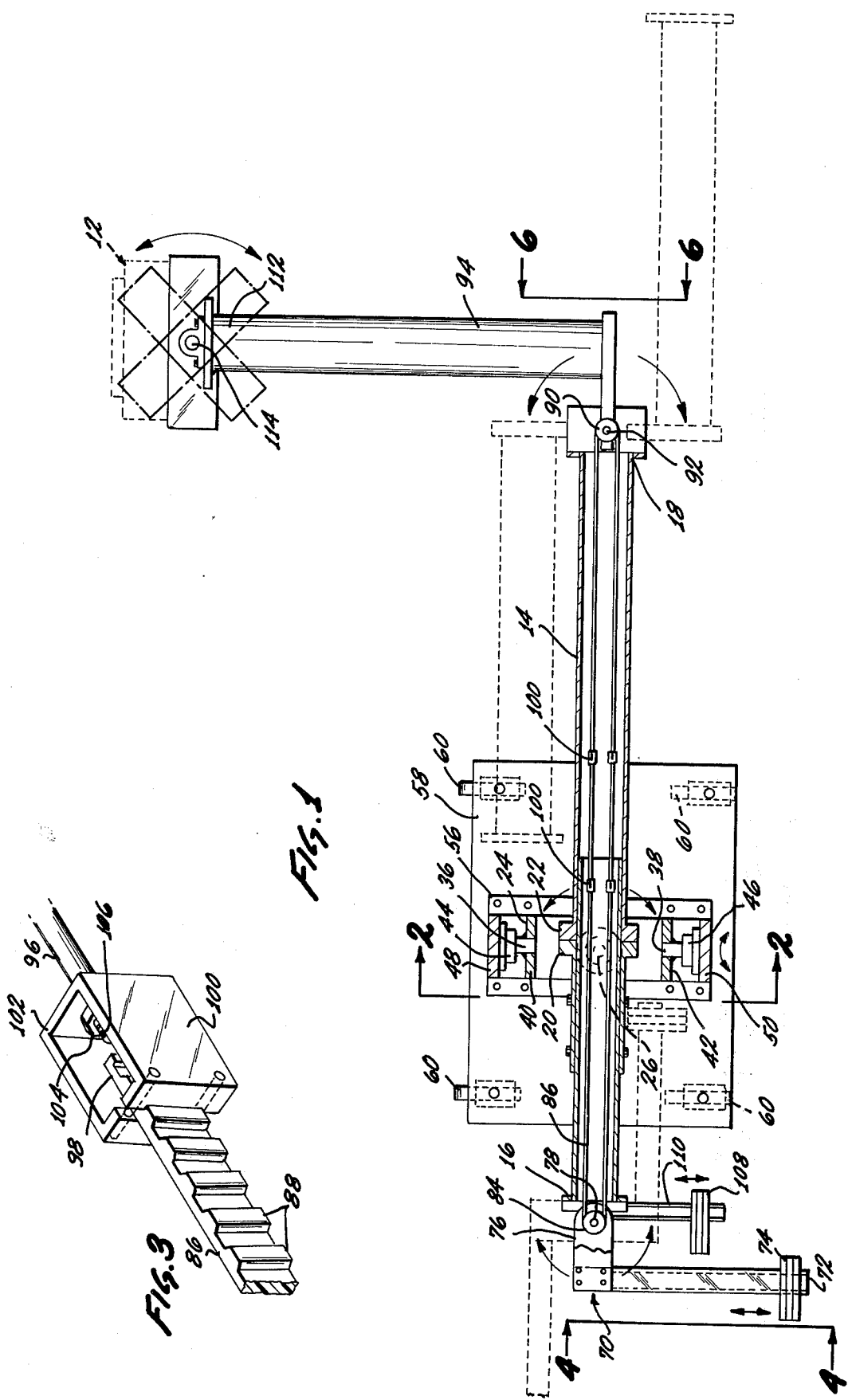
FIG. 1 is a plan view, partly in section, of a preferred embodiment of the invention.
Figure 2:
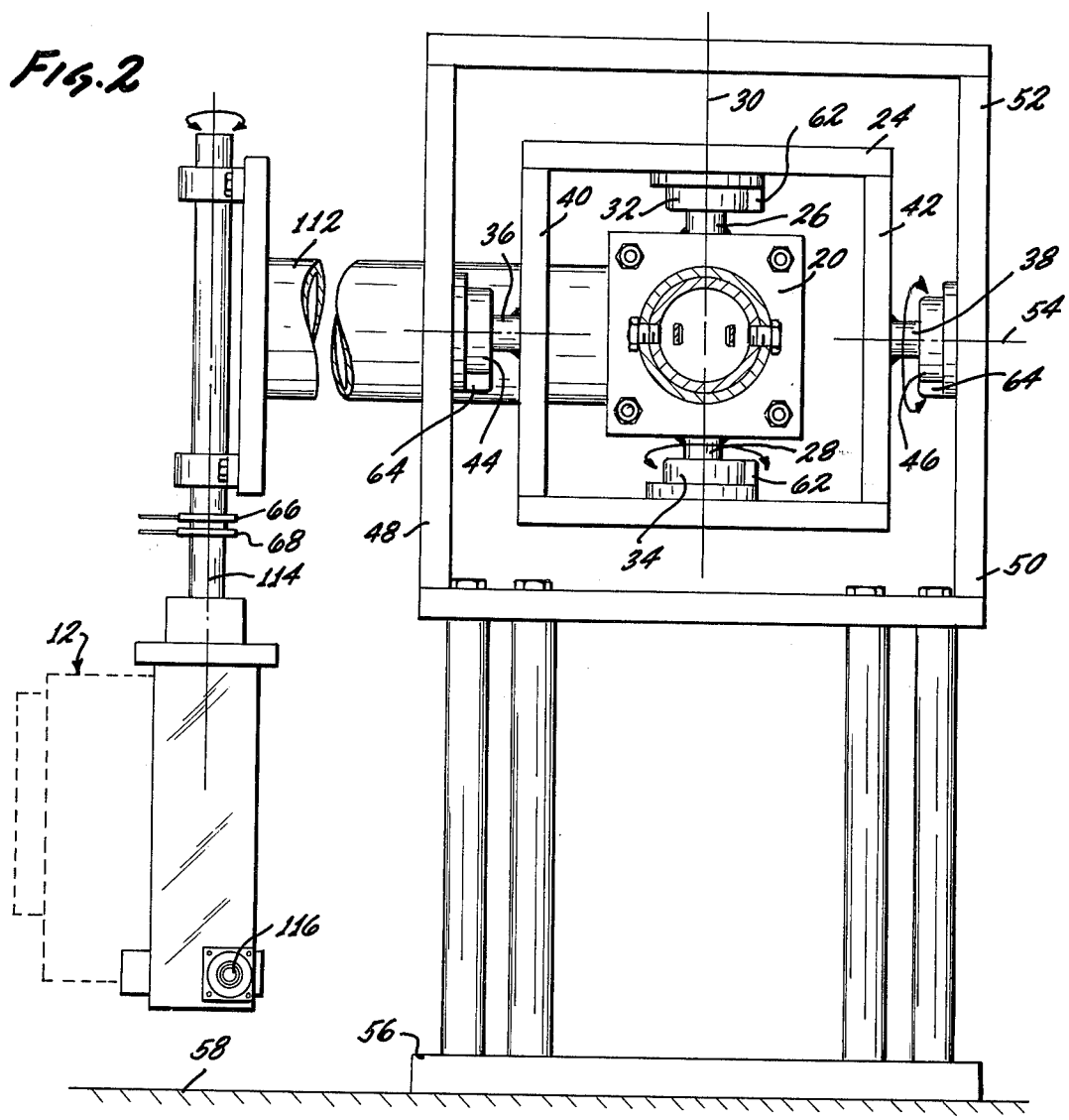
FIG. 2 is a section taken on the line 2—2 of FIG. 1 and looking in the direction of the arrows.

Referring to FIGS. 1 and 2, the preferred embodiment of the invention, which is particularly designed for supporting a camera 12 and providing the desired mobility therefor, may comprise a tubular primary support member 14 which is mounted intermediate its extremities 16 and 18 by means of annular bracket members 20, 22 within a rectangular frame housing 24 and trunions 26, 28 to swivel about the vertical axis 30. The trunions 26 and 28 extend into and are rotatably secured within the bearing boxes 32, 34 respectively. Desirably, the housing 24 may itself be provided with trunions 36, 38 extending from its sides 40, 42 respectively into further bearing boxes 44, 46 secured on the inside of the side walls 48, 50 of an outer boxlike housing 52. Thereby, the inner housing 24, with the primary support member 14 swivellingly mounted therein, may itself be swivelled about a horizontal axis 54.

The outer housing 52 desirably should be mounted securely on the platform 56 of a vehicle 58 having a plurality of casters 60. Desirably, however, each of the casters 60 should be provided with means for locking it against any movement after the apparatus has been brought into position from which photographing of the subject is to take place. Such locking means being well known in the art are not separately shown. In addition, hydraulically actuated locking means 62 and 64 are provided for both pairs of bearing boxes 32, 34 and 44, 46 respectively to enable each trunioned housing 24 and 52 respectively to be locked in any position into which it may be swivelled by the operator. Manual controls 66 and 68 desirably should be located on the axle 114 comprising part of the camera mounting means hereinafter to be described. Appropriate hydraulic lines not shown would of course extend between each control 66, 68 and a hydraulic cylinder also not shown, to actuate respectively the locking means 62, 64.

On the extremity 16 of the primary support member 14, may be rotatably mounted an "L" shaped secondary member or arm 70 toward the end 72 of which are disposed counterweights 74. As may be better seen in FIGS. 4 and 5, the arm 70 is rotatably mounted to the extremity 16 of the primary support member 14 by its leg 76 which is splined to the rotatable shaft 78 held between bearing brackets 80 and 82. Also splined to the shaft 78 for rotation therewith is a gear 84. A belt 86 having a series of notches 88, as best shown in FIG. 3, passes around the gear 84 and extends within the tubular primary support member 14 to pass around a similar gear 90 disposed in the other extremity 18 of the member 14 (See FIGS. 6 and 7). Gear 90 is splined to another shaft 92 which is rotatably held in the extremity 18 of the member 14 in the manner similar to the shaft 78 as shown in FIG. 5. Also splined to the shaft 92 is another "L" shaped arm 94 extending 180° oppositely to the arm 70 and which serves as a secondary support member for the camera 12. As may be seen in FIGS. 1 and 3, the belt 86 does not extend continuously throughout its entire length but desirably may be centrally interrupted by tensioning rods 96 which are connected to the ends 98 of segments of belt 86. Such connections may be provided by the open blocklike elements 100 by having the ends 106 of rods 96 inserted through orifices in one end 102 of such elements 100 and held by means of nuts 104 which may be tightened on the threaded ends 106 of the rods 96. By thus interposing the rods 96 between opposite segments of the belt 86, it may be seen that the belt may be kept in a properly tensioned condition. This arrangement is, of course, possible because neither gear 84 or 90 will rotate one full revolution when its shaft 78 or 92 respectively is splined to carry arm 70 or 94 respectively.

In addition, to providing the counterweight 74 towards the extremity 72 of the arm 70, it may also be desirable to provide a static counterweight 108 on a further arm extension 110 secured fixedly to the extremity 16 of the tubular member 14. The purpose of this latter counterweighting is to place in balance that portion of the tubular member 14 which is disposed toward the extremity 16 from the trunions 26, 28 with the portion of the tubular member extending towards such extremity from the trunions 26, 28 toward the extremity 18 together with the weight which is carried on extremity 18.

The camera 12 may be mounted on the extremity 112 of the arm 94 for pivoting about a shaft 114 and further could include means to enable the camera to be tilted with respect to a horizontal plane is by mounting on a transverse shaft 116.

In use, the vehicle 58 may be rolled by means of its wheels or casters 60 into the area in the vicinity of the subject to be photographed. The wheels or casters may then be locked against further movement and the camera 12 is attached to the shaft 114 at the extremity 112 of the arm 94. The counterweights 74 and 108 are then adjusted by moving them outwardly from the arms 70 and 110 until the entire device is in perfect balance. Assuming that the photographing is to be taken in a horizontal plane passing through the axis of the trunions 36 and 38, the primary support element 74 is disposed so that its axis also lies in such plane. Thereupon a locking means 64 is locked to prevent any rotation of the trunions 36, 38 in the bearing boxes 44, 46 respectively. With the apparatus balanced, it will be found that any movement of the camera in any direction in the horizontal plane in which it is disposed may be accomplished only by moving the arm 94 about the axis of the shaft 92. However, any such movement results in the gear 90 being rotated and this rotation is conveyed similarly to the gear 84 which, in turn through shaft 78, causes the arm 70 with its counterweight 72 to swing in the opposite direction from the directional swing of the arm 94. Thereby, the movement of the camera 12 is at all times smoothly counterbalanced by the movement of the counterweight 74. If the camera movement also involves the swivelling of the tubular element 14 about the trunions 26, 28, such movement is delicately accomplished by the fact that the member 14 is in perfect balance about the trunions 26, 28 through the arm 110 and its counterweight 108. It will be found, thus, that the camera is at all times firmly supported and its movement in any direction is smoothly counterweighted to the point where photographing may take place without any jossling or shaking of the camera continuously during movement of the camera in any direction of 360 degrees within the area into which it can be moved about the axis 30 of trunions 26 and 28. Should the cameraman desire that his camera be fixed in any position he may, by manipulating the control 66, effect a locking of the trunions 26, 28 in their bearing boxes 32, 34, respectively. Additional locking means (not shown) could, of course, be provided to lock the shaft 92 against rotation in its bearing members 118, 118.

Figure 8:
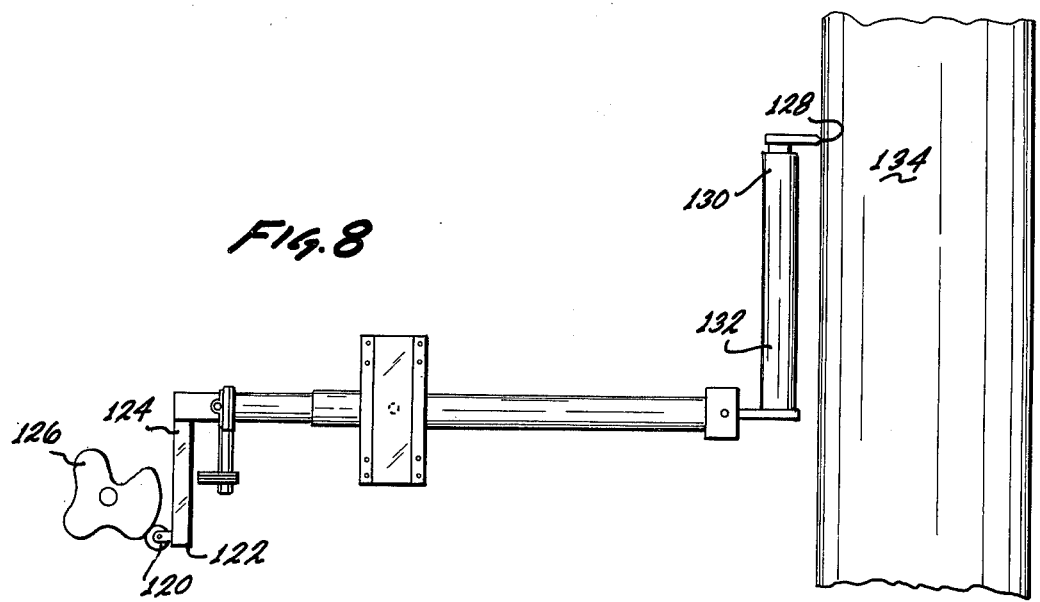
FIG. 8 is a schematic view showing the manner in which the apparatus could be adapted for cam operation with respect to a workpiece.

While the apparatus of the present invention is particularly suited for movably supporting a motion picture or video camera, it should be appreciated that it may have other applications, as for example those shown in FIGS. 8 and 9. Considering first FIG. 8, a cam follower 120 may be mounted to extend from the extremity 122 of the arm 124 to move about cam 126, and the movement of the cam follower 120 would result in corresponding opposite movement of a cutter 128 disposed on the extremity 130 of the arm 132 over a workpiece 134.

In the FIG. 9 embodiment of the invention, the apparatus is shown adapted for computerized motor control. Thus, one reversible motor 136 may be connected through gearing 138 to drive the counterweighted arm 140, while a second reversible motor 142 may be connected to drive the primary support member 144 about the axis 146 of its trunnions 148. Both motors 136 and 142 may be directed by a computer 150. If, then, a cutter or other device 152 is placed at the extremity 154 of the arm 156 the movement of such cutter or other device 152 may be effectively and smoothly directed by the computer 150.

It may be seen, thus, that the apparatus of the present invention not only lends itself to providing an effective smooth mobile support for a camera, but its principles of constructional operation may be utilized in other important applications.

I claim:

1. An articulated swivelling boom combination adapted to carry on one of its extremities a device and to enable said device to be moved about smoothly in any direction of 360° in a given plane within a predetermined area, said boom combination comprising:
   A. a base, said base including a supporting platform and first pivot bearing means projecting perpendicularly with reference to said platform, said bearing means being rotatable about a substantially vertical axis in a predetermined arc of rotation;
   B. an elongated rigid member, said member being mounted at a point intermediate its extremities on said pivot bearing means thereby to be pivotable in a plane normal to said axis, said member having in the vicinity of one of its two extremities a further second pivot bearing means and, in the vicinity of the other of its two extremities a third pivot bearing means, each of said second and third pivot bearing means being rotatable about an axis parallel to the axis of rotation of the first pivot bearing means;
   C. a first rigid elongated element, one end of said element being rotatably mounted on said member by the second pivot bearing means to be rotatable about the axis of said second bearing means, said first rigid element extending in a first direction from said second bearing means, and the other end of said element having means to carry said device;
   D. a second rigid elongated element, one end of said second element being rotatably mounted on said member by the third pivot bearing means to be rotatable about the axis of said third bearing means, said second rigid element extending from said third bearing means in a second direction, and the other end of said second element carrying counterweight means, the end of said member in the vicinity of which said second rigid element is mounted being counterweighted to equalize any static weight differential between that portion of said rigid member extending from the first pivot bearing means and rotatably carrying the first rigid element and said device, and the remaining portion of the rigid member extending oppositely from the first pivot bearing means and rotatably carrying the second rigid element, and said second rigid element being counterweighted at a point remote from the third pivot bearing means to equalize any change in weight distribution with reference to the second pivot bearing means which may be occasioned by rotation of the first rigid element carrying said device about said second pivot bearing means;
   E. two circular gear means, one of said circular gear means being secured to rotate with said first rigid element, the other of said circular gear means being secured to rotate with said second rigid element, each of said gear means being disposed coaxially with the axis of rotation of its respective rigid element about its respective pivot bearing means; and
   F. means connecting both of said gear means for co-ordinated rotation.

2. The combination as described in claim 1 wherein each of the first and second rigid elements is "L" shaped.

3. The combination as described in claim 1 wherein means are provided to mount the elongated rigid member for swivelling about a substantially horizontal axis.

4. The combination as described in claim 1 wherein the base is provided with castered wheels to enable the combination to be moved about over a ground surface into any desired location.

5. The device as described in claim 1 wherein the first pivot bearing means comprises a pair of trunnions extending from opposite sides of the elongated rigid member, and the base includes a surrounding housing having bearings rotatably to receive said trunnions.

6. The combination as described in claim 1 wherein the elongated rigid member is mounted by means of the first pivot bearing means on the base at a point not centered with respect to said member.

7. The combination as described in claim 1 wherein the elongated rigid member comprises a hollow tube.

8. The combination as described in claim 7 wherein the means connecting both said gear means for coordinated rotation extend within the tube constituting said elongated rigid member.

9. The combination as described in claim 1 wherein the extremity of the elongated rigid member on which the second rigid elongated element is rotatably mounted includes a fixed counterweight to balance the static weight of the elongated rigid member and the first rigid elongated element on the other side of the first pivot bearing means.

10. The combination as described in claim 1 wherein the means connecting both gear means for coordinated rotation comprises a notched belt portion extending around each of the circular gear means at least to the full extent to which such gear means may rotate in any swinging movement of the device.

11. The combination as described in claim 10 wherein the belt portions on opposite gear means are interconnected by pairs of tensioning rods.

12. The combination as described in claim 3 wherein manually actuatable control means are provided to lock the elongated rigid member against swivelling about either its horizontal axis or a vertical pivot axis.

13. The combination as described in claim 12 wherein the control means are disposed in the vicinity of the device at the end of the rigid element upon which it is carried.

14. The combination as described in claim 1 wherein first reversible motor means are provided to drive the gear means connected to rotate with the first rigid elongated element, and second motor means are provided to rotate to the elongated rigid member about the axis of the first pivot bearing means, and computer control means are connected to operate both said motor means.

15. The combination as described in claim 4 wherein the device is a machining tool.

16. A combination as described in claim 1 wherein the extremity of the second rigid element includes a cam follower which moves about a cam, and the extremity of the first rigid element is connected to a machining tool to operate the same on a workpiece.

\* \* \* \* \*